W. RECHNIOWSKI.
CAPILLARY TUBE SYSTEM MICROMETER.
APPLICATION FILED MAY 7, 1914.

1,133,400.

Patented Mar. 30, 1915.

Witnesses:
E. G. McGee.

Inventor:
Wazlaw Rechniowski
By Emil Bouwelycke
Attorney.

UNITED STATES PATENT OFFICE.

WAZLAW RECHNIOWSKI, OF ST. PETERSBURG, RUSSIA.

CAPILLARY-TUBE-SYSTEM MICROMETER.

1,133,400. Specification of Letters Patent. Patented Mar. 30, 1915.

Application filed May 7, 1914. Serial No. 836,972.

*To all whom it may concern:*

Be it known that I, WAZLAW RECHNIOWSKI, a subject of the Emperor of Russia, and a resident of St. Petersburg, Russia, have invented certain new and useful Improvements in Capillary-Tube-System Micrometers, of which the following is a specification.

In existing devices for measuring variations in length of a body, the amount of variation is magnified many times, to make such measuring possible by means of a system of levers with arms of unequal length. However, such devices offer various difficulties and besides mistakes in measuring may easily be made.

The present invention relates to a simplified manner of measuring length variations, by means of a piston moving in a cylinder filled with liquid and actuated by contact with the object to be measured, the cylinder being provided with narrow tubes, on which may be read off the variations in the level of the liquid caused by the axial displacement of the piston, thus magnifying this displacement, which corresponds to the variation in length of said object.

Figure 1:
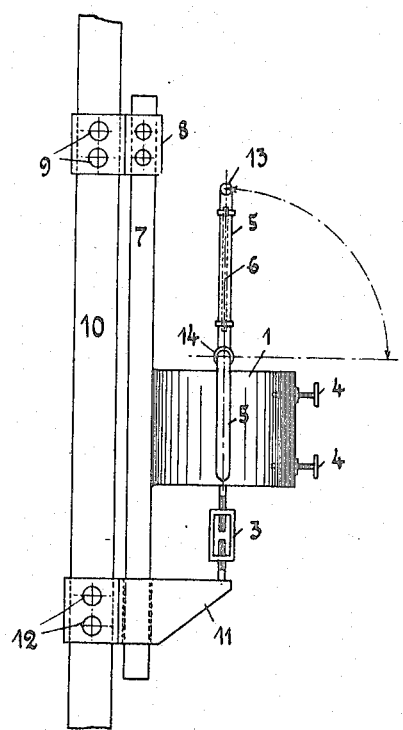
Figure 2:
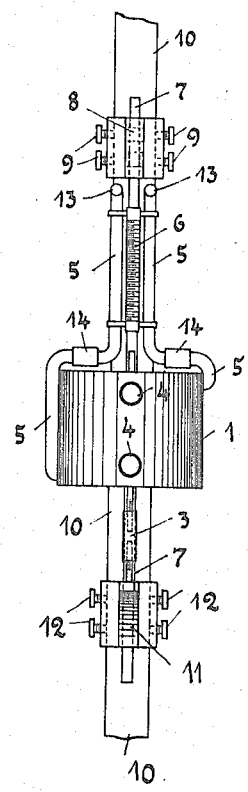
Figure 3:
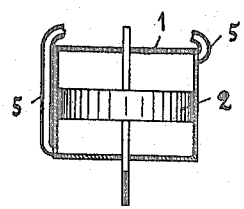

In the accompanying drawing, Figure 1 is a side view of the device; Fig. 2 a front view of the same and Fig. 3 a vertical section of the cylinder.

As seen on the drawing, the device consists of a cylinder 1 with a movable piston 2, to which is connected a pin with a nut 3. On each side of the piston 2 the cylinder is filled with a suitable liquid, for instance, mercury, and from each chamber formed in the cylinder by the movable piston, a narrow tube 5 projects, extending along a scale 6. Each tube 5 is provided at its upper end with a cock or plug 13 for the purpose of closing the tubes.

As the area of the piston represents a multiple of the cross-section of the tubes, every displacement of the piston will result in a movement of the liquid in the tubes, the extent of which represents a multiple of the movement of the piston. The tubes may be provided underneath with a joint 14 or an elastic guttapercha sleeve in order to insure as far as possible their vertical position in case the rod 10 or object to be tested should not be exactly in vertical position. The whole apparatus is fastened to a fixed rod 7, which, at its upper end may be secured, by means of a clamp 8 and set-screws 9, to the object 10, the length variation of which, occasioned under the influence of some force, is to be measured.

At the lower end of the fixed rod 7 there is arranged a movable socket 11 connected with the piston 2 by means of a spindle and the nut 3. The socket 11 is tightly fastened by means of set-screws 12 to the body of the object under examination.

In order to ascertain the strength of the object under examination, in the present case a prismatic rod 10, or to determine the force acting on such a rod at a given moment, the elongation in a certain length L of the object, is measured in the following way:—Before the force acts, the clamps 8 and 11 are tightly secured to the object 10 at a distance L from each other by means of set-screws 9 and 12. Thereafter, by the help of an adjusting nut 3 the liquid is brought to one and the same level in both tubes 5. As it is difficult to perform this by means of a single adjusting nut on account of the great difference between the areas of the large piston surface and of the small cross-section of the tubes 5, an auxiliary adjusting device 4 of known construction, such as adjusting screws, plungers or membranes is provided in cylinder 1 on either side of the piston, the area of which is not differing so much in respect to the orifice of the tubes. The auxiliary adjusting devices 4, here represented by two screws, are screwed in or out of the respective chambers formed above and below the piston 2. As a consequence the liquid will rise or fall in the corresponding pipes 5, and the levels may thus be equalized in these pipes. When the object under examination is subjected to a strain, then the change of the level of the liquid and also the extent of the elongation may be read off on the scale. During the measuring both tubes 5 must naturally be in communication with the atmosphere.

While the piston is moving owing to the change in length of the body under examination, the liquid in both narrow tubes is moving in opposite directions, *i. e.* while the level of the liquid in one of the tubes rises, the level in the other tube is sinking correspondingly. In this way is attained the essential advantage of elimination of an error in the reading, resulting from the influence of the change in temperature during the measuring, as this influence is manifesting itself on both sides of the piston; because, with equal volumes of liquid on both sides of the piston, the level of the liquid in both narrow tubes rises and falls in equal degrees through change of temperature.

The distance between the two levels of the liquid comprises a $2m$ multiple of the displacement of the piston where $m$ is the ratio of the area of the piston to the cross-section of the tubes.

With the help of a table it is then possible with a given ratio between the alteration of the elongation $\lambda$ and the length $L$ of the object under examination to determine the extent of the operating power $P$ on the ground of the formula $$P = E w \frac{\lambda}{L}$$

in which E means the modulus of elasticity and $w$ the cross section of the rod.

I claim:—

1. An instrument for measuring variations in length of a body comprising a cylinder, a piston normally positioned centrally in said cylinder, thus forming a chamber at each end, capillary tubes one communicating with one end of each chamber and running parallel outside of said cylinder, a common scale for said tubes, said chambers and part of said tubes being filled with liquid, a pair of clamps for engaging the object to be treated, one of said clamps being rigidly connected with the cylinder and the other with the piston and a fine-adjusting device between said slidable clamp and said piston.

2. An instrument for measuring variations in length of a body comprising a cylinder, a piston normally positioned centrally in said cylinder, thus forming a chamber at each end, capillary tubes one communicating with one end of each chamber and running parallel outside of said cylinder, a common scale for said tubes, said chambers and part of said tubes being filled with liquid, a pair of clamps for engaging the object to be treated, one of said clamps being rigidly connected with the cylinder and the other with the piston fine-adjusting device between said slidable clamp and said piston, and an auxiliary adjusting device in said cylinder, comprising a capacity varying member in each chamber, whereby the level of the liquid may be raised or lowered in each tube.

In testimony whereof, I have signed my name to this specification in the presence of two subscribing witnesses.

WAZLAW RECHNIOWSKI.

Witnesses:
H. A. LOVIAGUINE,
A. N. TSCHEKALOFF.